United States Patent
Cabrele et al.

(10) Patent No.: US 12,012,267 B2
(45) Date of Patent: Jun. 18, 2024

(54) CABLE TIE ARRANGEMENT

(71) Applicant: Illinois Tool Works Inc., Glenview, IL (US)

(72) Inventors: Federico Cabrele, Piazzola (IT); Waldemar Gaweda, Inowrocław (PL); Lorenzo Altarino, Padua (IT); Simone Brombin, Pontelongo (IT); Michele Lucon, Padua (IT); Leonardo Pellizaro, Rubano (IT)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/152,319

(22) Filed: Jan. 10, 2023

(65) Prior Publication Data

US 2023/0219729 A1    Jul. 13, 2023

(30) Foreign Application Priority Data

Jan. 11, 2022 (EP) .................................... 22151064
Dec. 22, 2022 (EP) .................................... 22215853

(51) Int. Cl.
*B65D 63/00* (2006.01)

(52) U.S. Cl.
CPC .................... *B65D 63/00* (2013.01)

(58) Field of Classification Search
CPC ....... B65D 63/00; B65D 63/14; F16L 3/2338; Y10T 24/1498
See application file for complete search history.

(56) References Cited

U.S. PATENT DOCUMENTS

| 3,744,096 A | * | 7/1973 | Kok ...................... B65D 63/14 24/16 PB |
| 4,498,507 A | | 2/1985 | Thompson |

(Continued)

FOREIGN PATENT DOCUMENTS

| GB | 1002153 A | 8/1965 |
| WO | 2011141581 A2 | 11/2011 |
| WO | 2012075034 A1 | 6/2012 |

OTHER PUBLICATIONS

Extended European Search Report from European Application No. 22215853.7, dated May 23, 2023 (10 pages).

(Continued)

*Primary Examiner* — Robert Sandy
*Assistant Examiner* — Louis A Mercado
(74) *Attorney, Agent, or Firm* — Neal, Gerber & Eisenberg LLP

(57) ABSTRACT

A cable tie arrangement for bundling one or more elongate members, and which includes a continuous strap having a planar surface free of any racks and a separate locking head defining an opening and having a metal locking element with a pair of opposed teeth extending into the opening and arranged to engage the strap in the opening. In use, a looped section of the strap bundles one or more elongate members on a first side of the locking head, and the looped section has an end section and a supply section extending through the locking head to a second side of the locking head in a first direction. Further, the opposed teeth are arranged to engage the planar surface of the end section and the supply section to prevent movement of the end section and the supply section in a second direction opposed to the first direction and to allow movement of the supply section in the first direction, and wherein the opposed teeth extend towards one (Continued)

another in the opening to press the end section and the supply section together in the opening.

19 Claims, 6 Drawing Sheets

(56) References Cited

U.S. PATENT DOCUMENTS

| | | | | |
|---|---|---|---|---|
| 4,653,155 A | * | 3/1987 | Hara | F16L 3/233 |
| | | | | 248/74.3 |
| 4,862,560 A | * | 9/1989 | Lichtenberg | B65D 63/16 |
| | | | | 24/17 AP |
| 4,862,561 A | | 9/1989 | Lichtenberg | |
| 5,121,524 A | * | 6/1992 | Mortensen | B65D 63/14 |
| | | | | 24/17 AP |
| 5,193,250 A | | 3/1993 | Caveney | |
| 5,193,251 A | | 3/1993 | Fortsch et al. | |
| 5,205,328 A | | 4/1993 | Johnson et al. | |
| 5,630,252 A | * | 5/1997 | Wells | B65D 63/1036 |
| | | | | 24/30.5 P |
| 5,784,747 A | * | 7/1998 | Girardot | A47L 13/16 |
| | | | | 15/209.1 |
| 6,128,809 A | * | 10/2000 | Khokhar | F16L 3/2338 |
| | | | | 24/168 |
| 6,484,366 B1 | | 11/2002 | Deschenes et al. | |
| 6,532,631 B2 | * | 3/2003 | Rohaly | B65D 63/16 |
| | | | | 248/74.3 |
| 6,826,806 B2 | * | 12/2004 | Eaton | A44B 11/25 |
| | | | | 24/584.1 |
| 7,263,745 B2 | * | 9/2007 | Mori | B65D 63/14 |
| | | | | 24/30.5 R |
| 7,328,487 B2 | * | 2/2008 | Hoffman | B65D 63/14 |
| | | | | 24/17 AP |
| 8,739,387 B1 | | 6/2014 | Frishberg | |
| 8,978,210 B2 | * | 3/2015 | Arjomand | B65D 63/14 |
| | | | | 24/17 AP |
| 9,555,943 B2 | | 1/2017 | Breen et al. | |
| 11,174,083 B1 | * | 11/2021 | Rivero | B65D 63/16 |
| 2011/0225777 A1 | | 9/2011 | Arjomand | |
| 2018/0141732 A1 | | 5/2018 | Seok | |

OTHER PUBLICATIONS

2-Lock™ Elematic, retrieved from https://www.itw-elematic.com/en/Cable-ties-and-accessories/Cable-ties-with-double-metallic-tooth/2-LOCK%E2%84%A2-ELEMATIC_pITELEMATIC_183817sharp0.htm, available prior to Jan. 11, 2022.

\* cited by examiner

CABLE TIE ARRANGEMENT

PRIORITY

The present application claims priority to and the benefit of European Patent Application No. 22215853.7, filed Dec. 22, 2022, and European Patent Application No. 22151064.7, filed Jan. 11, 2022, the entire contents of each of which are incorporated herein by reference.

This present disclosure relates to a cable tie arrangement. More specifically, although not exclusively, this present disclosure relates to a cable tie arrangement for bundling one or more members, such as but not limited to wires, cables, tubes, pipes, or other members.

BACKGROUND

Prior art cable tie arrangements have a periodic arrangement of raised elements which extend along the length of a strap. These raised elements engage an extension in a locking head to bundle cables or similar in a ratchetting manner. However, since the tension in the strap is determined by the spacing between the raised elements, this can result in poor or loose bundling in some instances.

The present disclosure seeks to address at least some of these issues.

SUMMARY

According to various embodiments of the present disclosure, there is provided a cable tie arrangement for bundling one or more elongate members, the cable tie arrangement comprising: (a) a continuous strap having a planar surface free of any racks, and (b) a separate locking head defining an opening and having a metal locking element comprising a pair of opposed teeth extending into the opening and arranged to engage the strap in the opening, wherein, in use, the continuous strap comprises a looped section arranged to bundle one or more elongate members on a first side of the locking head, and the looped section has an end section and a supply section extending through the locking head to a second side of the locking head in a first direction, wherein the opposed teeth are arranged to engage the planar surface of the end section and the supply section to prevent movement of the end section and the supply section in a second direction opposed to the first direction and to allow movement of the supply section in the first direction, and wherein the opposed teeth extend towards one another in the opening, to press the end section and the supply section together in the opening.

Advantageously, in various embodiments, the planar surface has a raised central portion. In various embodiments, the strap comprises a second raised central portion on an opposed side of the strap to the first raised central portion.

Advantageously, in various embodiments, the opposed teeth are arranged to engage the raised central portion.

Advantageously, in various embodiments, the continuous strap comprises a second planar surface opposed the first planar surface. In various embodiments, the second planar surface is arranged substantially the same as the first planar surface.

Advantageously, in various embodiments, the locking head comprises one or more shoulders for guiding the continuous strap through the opening.

Advantageously, in various embodiments, the metal locking element circumscribes the opening.

Advantageously, in various embodiments, the locking head comprises inter-engaging elements for engaging with a further corresponding locking head.

Advantageously, in various embodiments, the strap has a thickness, and the opposed teeth define a gap extending perpendicularly therebetween, and wherein the gap is substantially twice the thickness of the strap.

According to further various embodiments of the present disclosure, there is provided a locking head for use in a cable tie arrangement wherein the locking head comprising: (a) an opening, and a metal locking element comprising a pair of opposed teeth extending into the opening and arranged to engage a strap in the opening, wherein the opposed teeth are arranged to engage a planar surface of an end section and a supply section of the strap to prevent movement of the end section and the supply section in a second direction opposed to the first direction and to allow movement of the supply section in the first direction, and wherein the opposed teeth extend towards one another in the opening to press the end section and the supply section together in the opening.

In various embodiments, a magazine comprising a plurality of locking heads is provided.

In various embodiments, a reel of continuous strap for use in a cable tie arrangement is provided.

BRIEF DESCRIPTION OF THE DRAWINGS

Various embodiments of the present disclosure are further described hereinafter with reference to the accompanying drawings.

DETAILED DESCRIPTION

Figure 1:
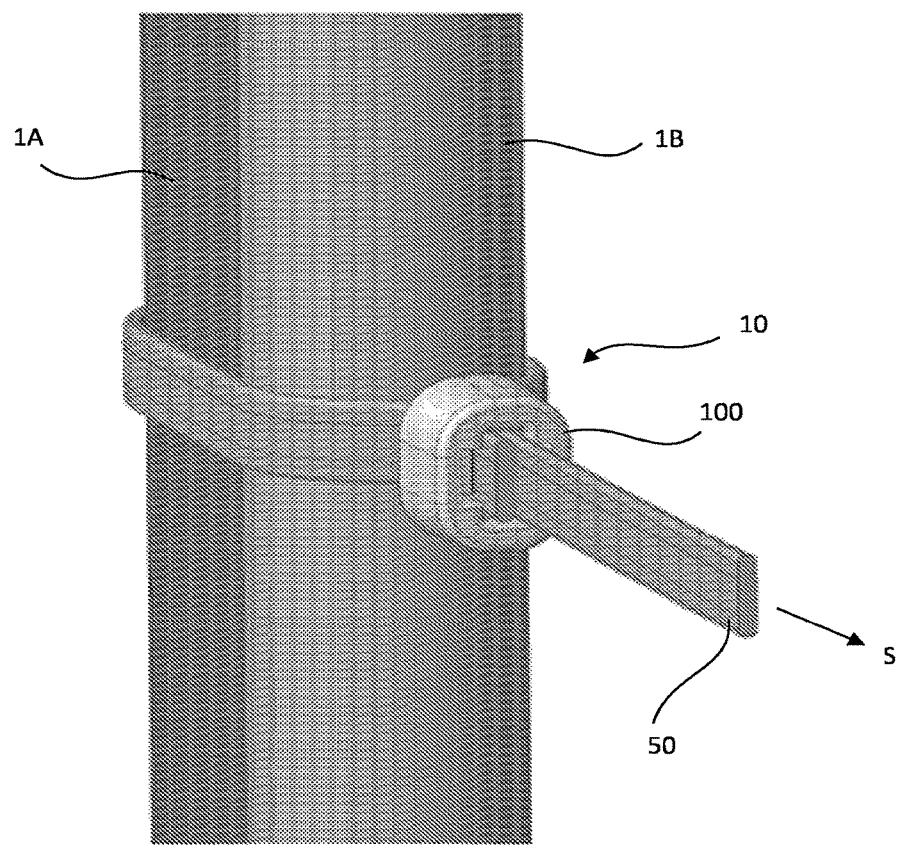
FIG. 1 illustrates an exemplary cable tie arrangement of one embodiment of the present disclosure with two elongate members in a perspective view.

While the systems, devices, and methods described herein may be embodied in various forms, the drawings show, and the specification describes certain exemplary and non-limiting embodiments. Not all components shown in the drawings and described in the specification may be required, and certain implementations may include additional, different, or fewer components. Variations in the arrangement and type of the components; the shapes, sizes, and materials of the components; and the manners of connections of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as mounted, connected, etc., are not intended to be limited to direct mounting methods but should be interpreted broadly to include indirect and operably mounted, connected, and like mounting methods. This specification is intended to be taken as a whole and interpreted in accordance with the principles of the present disclosure and as understood by one of ordinary skill in the art.

The described example embodiment relates to cable ties used for bunding a plurality of members such as but not limited to cables, wires, conduits, and the like.

Certain terminology may be used in the following description for convenience only and is not limiting. The words 'right', 'left', 'upper', 'front', 'rear', 'upward', 'down', 'downward', 'above' and 'below' designate directions in the drawings to which reference is made and are with respect to the described component when assembled and mounted (e.g., in situ). The words 'inner', 'inwardly' and 'outer', 'outwardly' refer to directions toward and away from, respectively, a designated centreline or a geometric centre of an element being described (e.g., central axis), the particular meaning being readily apparent from the context of the description.

Further, as used herein, the terms 'connected', 'attached', 'coupled', 'mounted' are intended to include direct connections between two members without any other members interposed therebetween, as well as indirect connections between members in which one or more other members are interposed therebetween. The terminology includes the words specifically mentioned above, derivatives thereof, and words of similar import.

Further, unless otherwise specified, the use of ordinal adjectives, such as, 'first', 'second', 'third' etc. merely indicate that different instances of like objects are being referred to and are not intended to imply that the objects so described must be in a given sequence, either temporally, spatially, in ranking or in any other manner.

Through the description and claims of this specification, the terms 'comprise' and 'contain', and variations thereof, are interpreted to mean including but not limited to', and they are not intended to (and do not) exclude other moieties, additives, components, integers, or steps. Throughout the description and claims of this specification, the singular encompasses the plural unless the context otherwise requires. In particular, where the indefinite article is used, the specification is to be understood as contemplating plurality, as well as, singularity, unless the context requires otherwise.

Features, integers, characteristics, compounds, chemical moieties, or groups described in conjunction with a particular aspect, embodiment or example of the present disclosure are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The present disclosure is not restricted to the details of any foregoing embodiments. The present disclosure extends to any novel one, or any novel combination, of the features disclosed in this specification (including any accompanying claims, abstract or drawings), or to any novel one, or any novel combination, of the steps of any method or process so disclosed.

Figure 2:
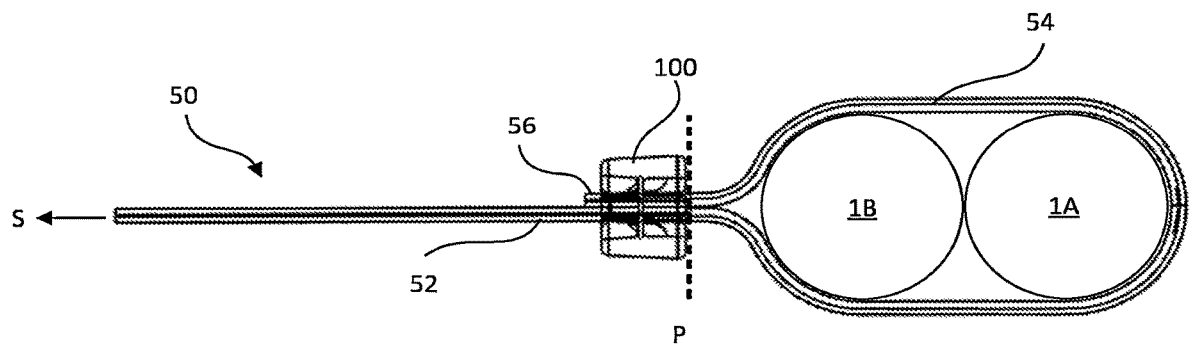
FIG. 2 illustrates the exemplary cable tie arrangement with two elongate members of FIG. 1 in a top view.
Figure 10:
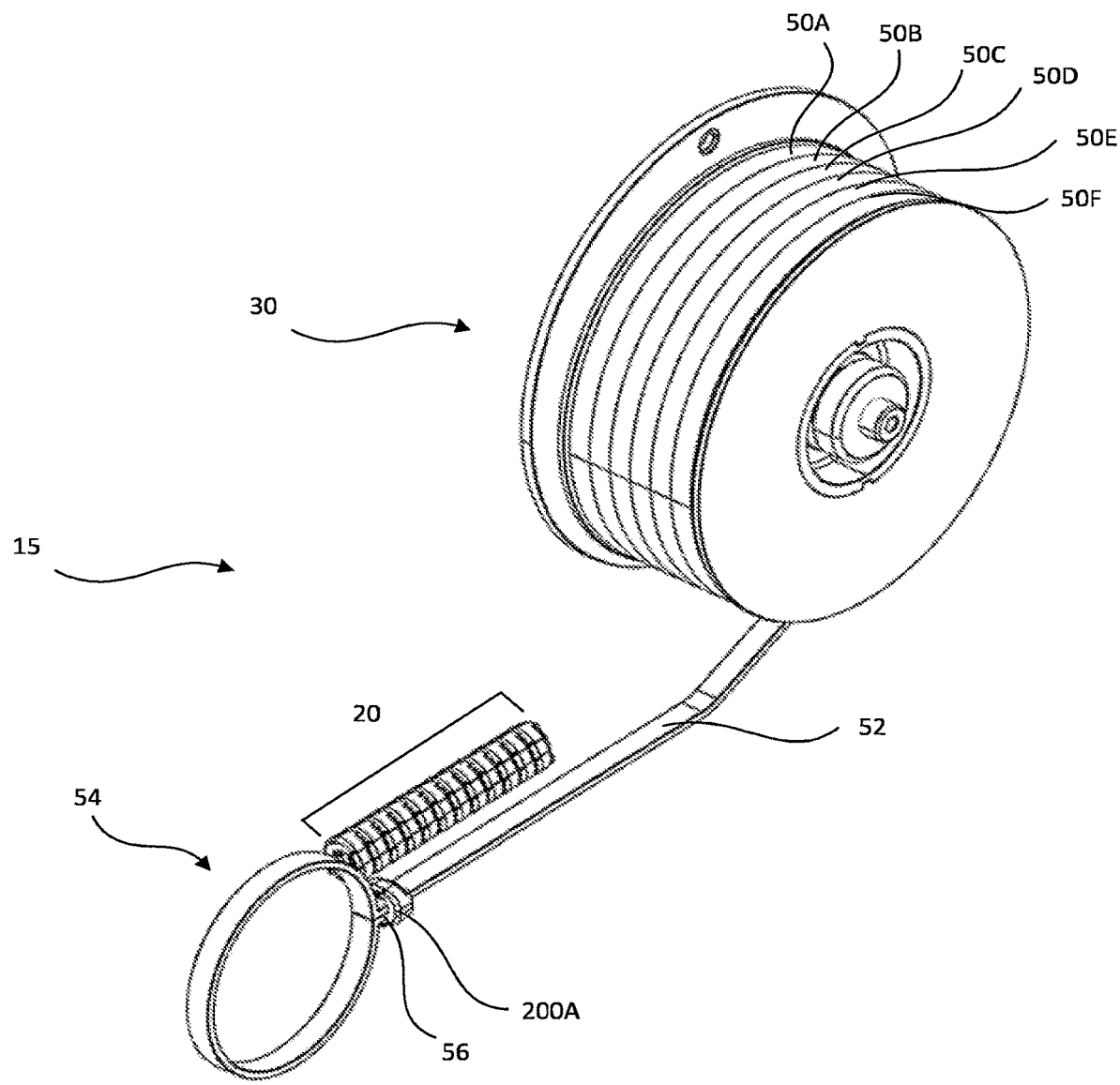
FIG. 10 is a perspective view of an exemplary cable tie assembly rolled up in a magazine of a tool, with an array of locking heads as provided with the tool in accordance with the present disclosure.

FIGS. 1 and 2 illustrate an exemplary cable tie arrangement 10 with two elongate members 1A and 1B, for example, wires, cables, tubes, pipes, or other members. The illustrated cable tie arrangement 10 includes a locking head 100 and a section of a continuous strap 50 looped around the elongate members 1A and 1B. The continuous strap 50 includes a supply section 52 which passes through an opening 105 of the locking head 100. In some cases, the supply section 52 is fed from a supply 'S' of strap material, for example, a reel 30 of strap material as shown in FIG. 10. The continuous strap 50 also includes a looped section 54 which circumscribes the elongate members 1A and 1B to bundle the elongate members 1A and 1B on one side of the locking head 100, and an end section 56 which passes through the opening 105 in the locking head 100. The supply section 52, the looped section 54, and the end section 56 are shown as forming a continuum from one section to the other section. As shown in FIG. 2, the supply section 52 passes from a first side of a plane 'P' defined by the locking head 100 to a second side of the locking head 100 in a first direction A1 (see FIG. 6), and the end section 56 passes from the second side of the plane to the first side through the locking head 100 in a second direction opposed to the first direction A1.

Figure 3:
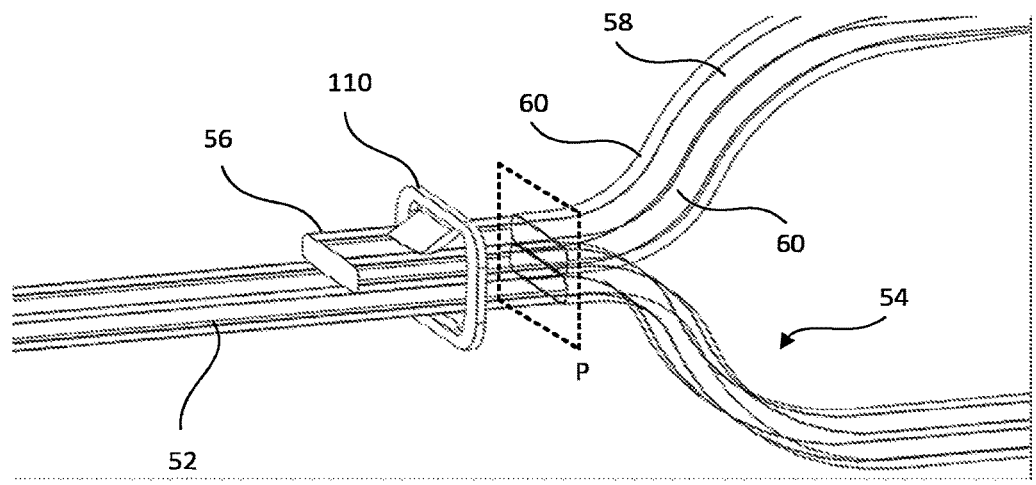
FIG. 3 is a perspective view of the cable tie arrangement of FIG. 2 with parts of a locking head omitted (schematic).

FIG. 3 is a perspective view of the cable tie arrangement of FIG. 2 with certain parts of the locking head 100 omitted.

Figure 4:
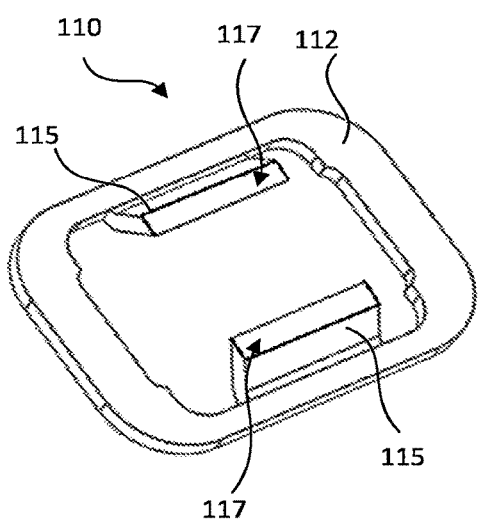
FIG. 4 illustrates an exemplary metal locking element of the locking head in a perspective view.

With reference to FIG. 4, a locking element 110 is provided in the locking head 100 that is configured to restrict relative movement between the supply section 52 and the end section 56 within the opening 105 of the locking head 100 to securely bundle the plurality of elongate members 1A and 1B. The illustrated locking element 110 comprises metal, but it should be apparent that this was not essential, and that in other cases, the locking element 110 may contain other materials in addition to, or as an alternative to metal. The locking head 100 includes a body in which the locking element 110 is inserted. The body of the locking head 100 defines the opening 105 and the locking element 110 includes a body 112 configured to circumscribe the opening 105 in the locking head 100. While the opening 105 is shown as substantially rectangular and the overlapping supply section 52 and end section 56 have a corresponding cross-section, it should be apparent that this was not essential. In some cases, the opening 105 can have other cross-sections which correspond to the cross-section of the strap 50. The locking element 110 includes a pair of teeth 115 configured to engage the supply section 52 and the end section 56. In particular, the teeth 115 grip or bite into a smooth planar surface of the strap 50. The planar surface of the strap 50 may extend across the entire width of the strap 50 or a portion of the strap 50 as will be explained below. While the teeth 115 are shown extending across partially across the width of the strap 50, it should be apparent that the teeth 115 may extend across the entire width of the strap 50. The term "smooth" should be understood as meaning free of protrusions, racks, or similar elements which are raised from the surface of the strap 50. An advantage of the present disclosure is a smooth strap enables better bundling of elongate members 1A and 1B, as the strap 50 can be tightened optimally based on the overall cross-section of the elongate members 1A and 1B and by the teeth 115 biting into the planar surface. This is in contrast to prior art straps, where extensions engage the raised protrusions or racks of a strap, rather than the main surface of the strap which results in poor or loose bundling.

Figure 5:
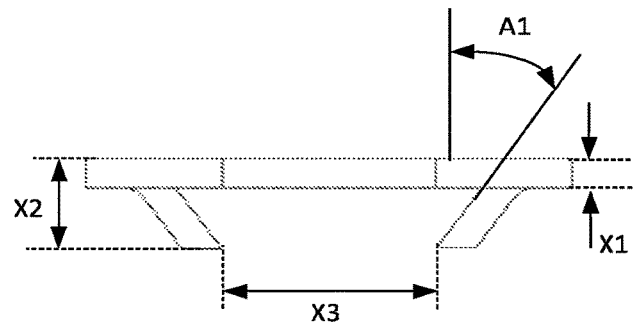
FIG. 5 illustrates the locking element of FIG. 4 in a side view.
Figure 6:
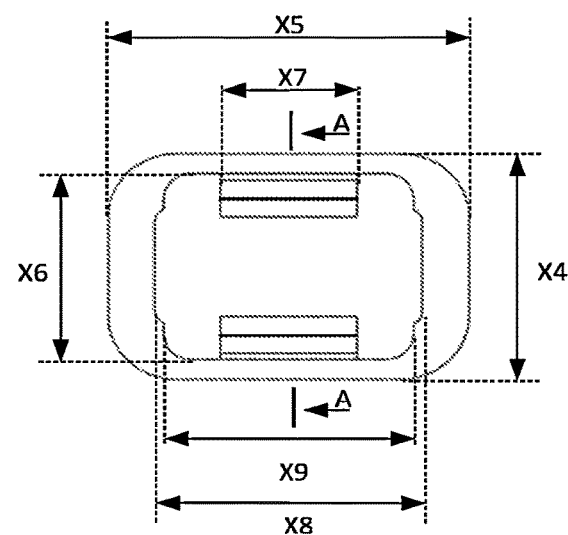
FIG. 6 illustrates the locking element of FIG. 4 in a top view.

FIG. 5 shows a side view of the locking element 110. With reference to FIGS. 5 and 6, the locking element 110 is formed of a plate having a thickness X1, an overall width X5 (taken as the horizontal distance in the orientation shown in FIG. 6) and an overall height X4 (taken as the vertical distance in the orientation shown in FIG. 6). The teeth 115 extend at an acute angle relative to a plane defined by the body 112 of the locking 110. The example locking element 100 shown in FIG. 5 has the teeth 115 extending at an angle A1 relative to an axis normal to the plane of the body 112. A gap X3 is formed between the free ends of the teeth 115, and the space between the base of the teeth 115, the base being where the teeth 115 connect to the body 112, is at a distance X6. The teeth 115 have a width X7 and protrude from the body 112 by 0.7 mm (taken as the difference between X2 and X1). The body 112 forms an annulus around the opening 105 and has a first inner width X8 and a second inner width X9. The different inner widths X8 and X9 of the body 112 help to accommodate the strap 50, particularly, where the strap 50 has one or more peripheral portions 60 (see FIG. 9) as will be explained below. It should be apparent that the dimensions provided are merely examples of suitable dimensions for a strap 50 having corresponding dimensions. A similar locking element 110 could be configured with variations on these dimensions either with respect to the absolute values provided herein, or the ratios between the values provided herein. As shown in FIGS. 4 and 5, the teeth 115 have a face 117 which is substantially perpendicular to an insertion direction D1 of the strap 50 (see FIG. 8). An edge of each tooth 115 which defines the face 117 can be considered to form a blade which engages the surface of the strap 50 and grips the strap 50 when inserted into the locking head 100.

Figure 7:
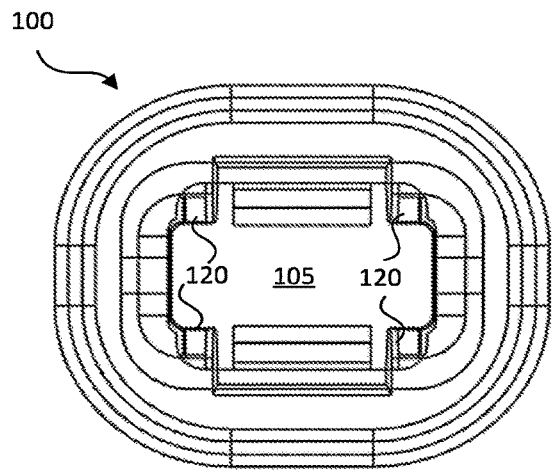
FIG. 7 illustrates the locking head of the cable tie arrangement of FIG. 1 in a perspective view.

As shown in FIG. 7, the locking head 100 body can also include shoulders 120 to guide either or both of the supply section 52 and the end section 56 of the strap through the opening 105. While four shoulders 120 are shown, it should be apparent that this was merely exemplary and that one or more shoulders 120 could be provided to achieve the same function. While the shoulders 120 are shown at opposed corners of the opening 105 it should be apparent that this was not essential and that other arrangements would be suitable for guiding the strap 50.

Figure 8:
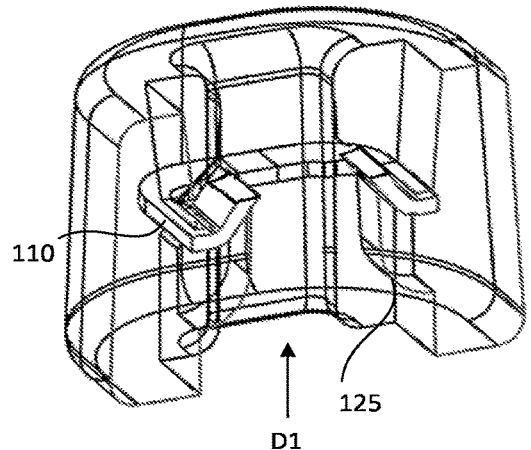
FIG. 8 shows a cross-sectional perspective view of the locking head of FIG. 7 (transparent).

FIG. 8 is a cross-sectional view of the locking head 100 of FIG. 5. The locking element 110 is shown inserted in the body of the locking head 110 and the teeth 115 are angled to allow the strap 50, or a section 52 and 56 thereof, to pass in a first direction D1, but not in a second direction opposed to D1. The teeth 115 of the locking element 110 extend into the opening 105 and have a curved base section which extends from a substantially perpendicular angle relative to the first direction D1, to an acute angle relative to the first direction.

A buttress or supporting portion 125 of the body of the locking head 110 is also shown in FIG. 8. This helps to resist motion of the strap sections 52 and 56 in the second direction by abutting the teeth 115, thereby stiffening the teeth 115 and increasing the resistance of the locking head 110 to motion of the strap sections 52 and 56 in the second direction. While a single solid supporting portion 125 is provided for each tooth 115, it should be apparent this was not essential and the supporting portion 125 may be formed of a plurality of supporting portions 125. Similarly, the supporting portion 125 may only extend partially along the length of each tooth 115. For example, supporting the base section entirely and only supporting a part of the remaining tooth 115 as shown in FIG. 8.

Figure 9A:
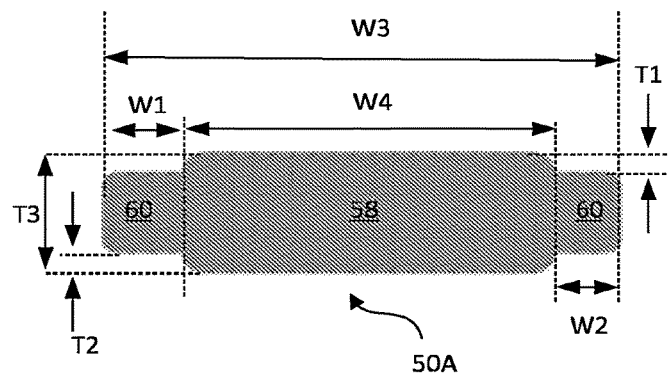
FIGS. 9A, 9B, and 9C show cross-sectional views of different exemplary straps in accordance with the present disclosure.
Figure 9C:
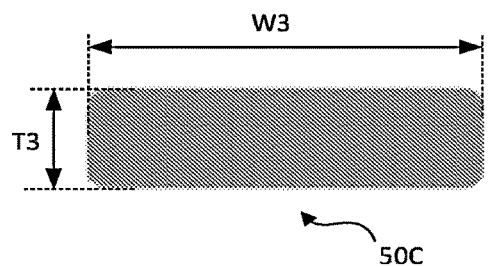
Figure 9B:
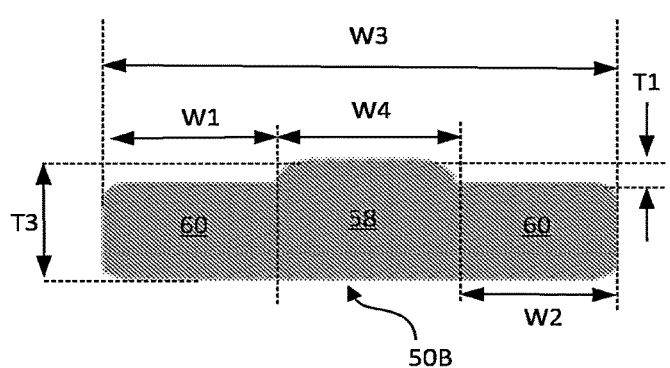

FIGS. 9A, 9B, and 9C illustrate a cross-sectional view of different exemplary straps 50A, 50B, and 50C. As shown in FIG. 9A, the strap 50A has a substantially rectangular cross-section defining an overall width W3 and thickness T3. The overall thickness of the strap 50A T3 is approximately 1.0 mm and the overall width W3 is approximately 4.5 mm. An alternative exemplary strap may have an overall width W3 of approximately 7.5 mm and an overall thickness T3 of approximately 1.5 mm. However, it should be apparent these were merely exemplary dimensions and the straps described herein may have other dimensions. It should be apparent the gap X3 between the teeth 115 corresponds to twice the thickness T3 of strap 50A, as the supply section 52 and the end section 56 overlap in the opening 105. In some cases, the gap X3 may be between one and two times the thickness T3 of the strap 50A, as this may provide a more robust grip on the ends 52 and 56 of the strap in the opening 105 as the teeth 115 are deformed by the sections of strap 50A passing therebetween. It should be apparent that the gap X3 would be greater than the strap 50A thickness T3. The strap 50A is also shown having a raised central portion 58 which provides the planar surface against which the teeth 115 can engage the strap sections 52, 56. The teeth 115 extend across substantially the width of the raised central portion 58. In some cases, the teeth 115 may also extend across a part of the whole of the peripheral portion 60. Peripheral portions 60 are adjacent the central portion 58 and extend substantially along the length of the strap 50A. The peripheral portions help to align the central portion 58 within the opening 105 and facilitate good engagement between the teeth 115 and the central portion 58. The raised central portion 58 has a width W4 that is greater than or equal to half the width X7 of the tooth 115. For example, the raised section may have a width of 2 mm. By way of example, each of the peripheral portions 60 has a width W1, W2. The central portion 58 is raised relative to the peripheral portion 60 on a first side by a distance T1 and a second side by a distance T2. It should be apparent that the peripheral portions 60 do not need to have the same dimensions and that T1 and T2 may be different to one another, and that W1 and W2 may be different to one another. The opening 105 is configured to accommodate the peripheral portions 60 between the shoulders 120. In some cases, only the raised central portion 58 engages the teeth 115. It should be apparent that the raised central portion 58 may only be raised on a single side of the strap 50A, such as shown in FIG. 9B. As the strap 50A is looped back on itself such that the supply section 52 and end section 56 overlap and abut one another in the opening 105, the abutting sides of the supply section 52 and end section 56 need not have a raised section 58. In some cases, the strap 50A may have a uniform cross section, such that there is no raised central portion 58. However, in either case, by angling the teeth 115 towards one another in the opening 105, the supply section 52 and the end section 56 are squeezed in the opening 105. This further enhances the frictional engagement of the teeth 115 against the smooth surface of the strap 50A. FIG. 9B illustrates an alternative exemplary strap 50B having a raised section 58 only on a single side of the strap 50B. The raised section 58 is narrower than that illustrated in strap 50A. For example, the raised section 58 of strap 50B is less than or equal to half of the width X7 of the tooth 115. It should be apparent that strap 50A may include a similarly narrow raised section 58. FIG. 9C illustrates a further exemplary strap 50C having no raised portions. Strap 50C has a substantially rectangular cross-sectional profile.

FIG. 10 is a perspective view of an exemplary cable tie assembly 15. The cable tie assembly 15 includes a reel 30 with six continuous straps 50A to 50F shown mounted thereto. Each strap 50A to 50F may have any of the features described above in relation to the strap of FIG. 9. A continuous strap 50 enables the looped section 54 to have any length, and thus allows for a greater range of elongate members 1A and 1B to be bundled. The assembly 15 also includes a magazine 20 of locking heads, and a single "active" locking head 200A through which a supply section 52 and an end section 56 of one of the straps 50A to 50F extends in the manner described above. The elongate members 1A and 1B have been omitted from the looped section 54 for clarity. Once a user has finished with a given strap, for example strap 50A, they can simply draw a new strap, for example 50B, through the next "active" locking head from magazine 20. This provides a more efficient cable tie arrangement than previous arrangements, as additional straps 50A to 50F and/or magazines 20 can be pre-loaded in a given cable tie tool so the user does not have to spend time loading individual locking heads 100, 200 or straps 50 when on site. It should be apparent that locking head 100 may be used in the cable tie assembly 15 in the same manner as locking head 200.

Figure 11A:
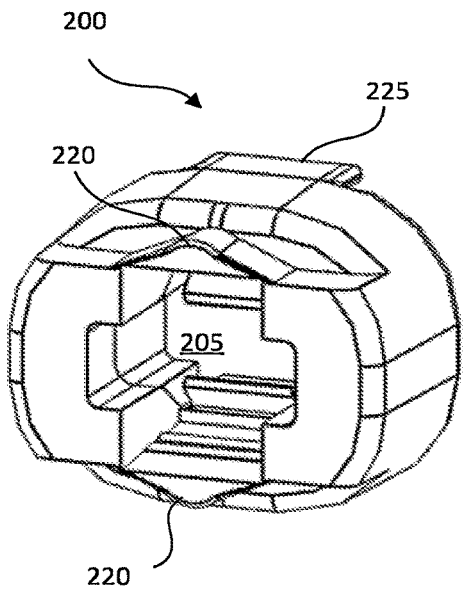
FIGS. 11A and 11B are perspective views of an alternative locking head in accordance with the present disclosure.
Figure 11B:
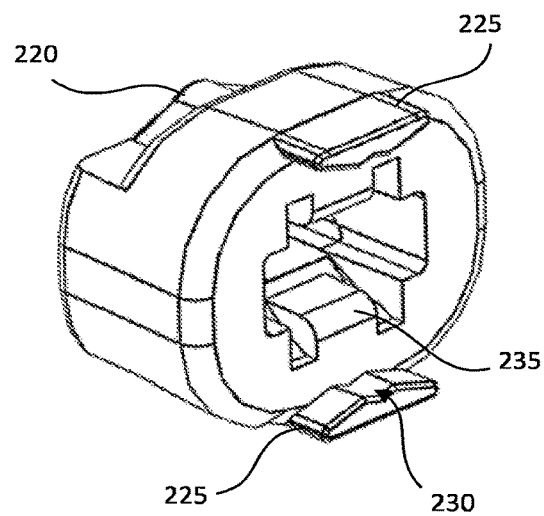
Figure 12A:
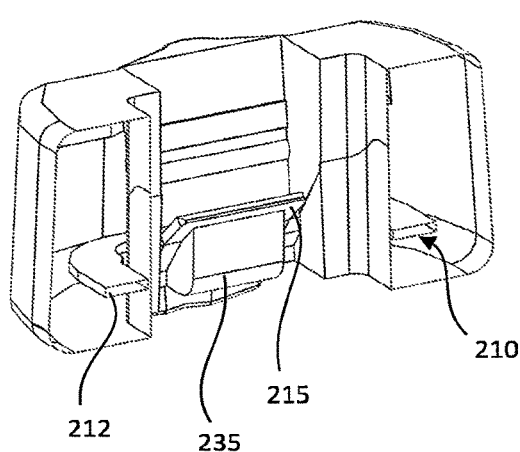
FIGS. 12A and 12B are respective cross-sectional views of the locking head of FIGS. 11A and 11B in accordance with the present disclosure.
Figure 12B:
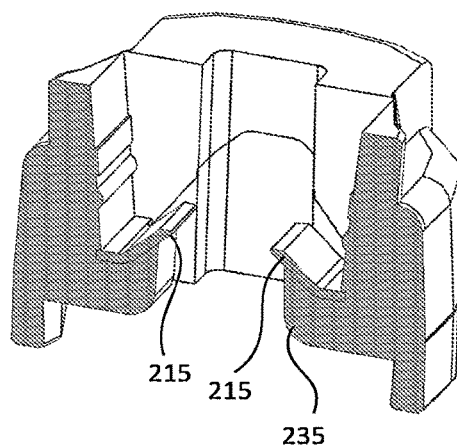

FIGS. 11A and 11B are perspective views of an alternative locking head 200. The locking head 200 has an opening 205 and a locking element 210 that function in a similar manner as opening 105 and locking element 110 described above. As shown in FIG. 12A, the locking element 110 circumscribes the opening 205 and teeth 215 extend from the body 212 into the opening 205 to grip the strap sections 52, 56 that pass through the opening 205 so that the sections 52 and 56 can be pulled through the opening 205 in a first direction but are resisted from being pulled through the opening 205 in the opposite direction. A supporting portion 235 is also provided which functions in a similar manner to supporting portion 125 described above.

Figure 14:
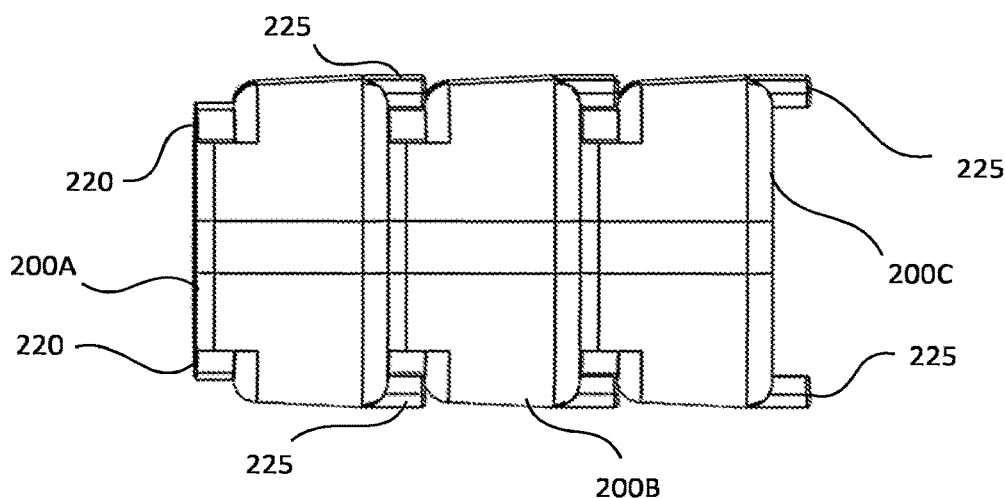
FIG. 14 is a side view of the array of FIG. 13 with some locking heads omitted.

The locking head 200 is also shown having a pair of tabs 225 and a pair of protrusions 220 which engage corresponding tabs 225 and protrusions 220 on an adjacent locking head 200. While the tabs 225 and protrusions 220 are formed on the same sides of the locking heads 200 from which the teeth 115 extend (i.e., the upper and lower sides as shown in FIG. 14), it should be apparent this was not essential and that the protrusions 220 and tabs 225 may be formed on different sides to those from which the teeth 115 extend. It should also be apparent that the tabs 225 and protrusions 220 were merely one example of suitable inter-engaging mechanical elements that enable one locking head 200 to be releasably connected to a second locking head 200.

Figure 13:
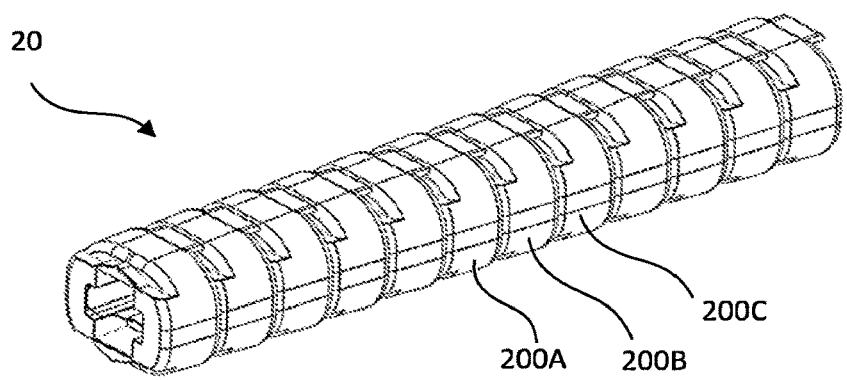
FIG. 13 is a perspective view of an exemplary array of locking heads as provided within a tool magazine in accordance with the present disclosure.
Figure 15:
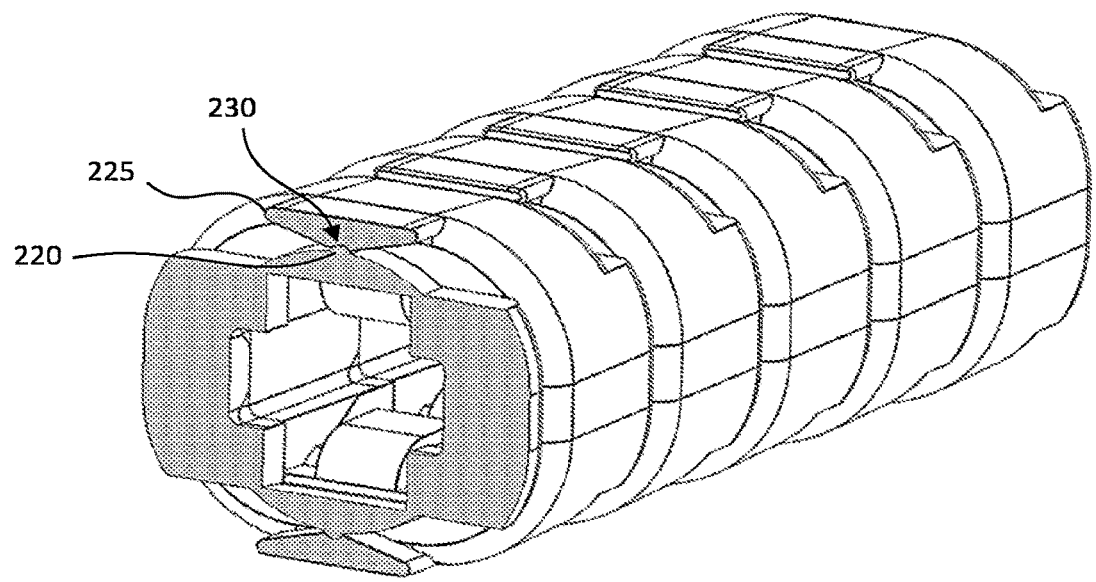
FIG. 15 shows the array of FIG. 13 with a cross-sectional view of the front locking head.

As shown in FIG. 13, a series of locking heads 200 to be connected to form a magazine 20 of locking heads 200. Locking heads 200A to 200C are all formed substantially identically to one another and are connected to one another via the protrusions 220 and tabs 225. As shown in FIGS. 14 and 15, each tab 225 has a recess 230 formed therein for receiving the protrusion 220 of an adjacent locking head 200. The magazine 20 can then be loaded in a cable tie tool, and as the next locking head 200 is required, a locking head on the end of the magazine 20 can be easily separated from the remaining locking heads 200 to become the "active" locking head 200A for the strap 50 to be drawn through in the manner described above.

Features, integers, characteristics, or groups described in conjunction with a particular aspect, embodiment or example of the present disclosure are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The present disclosure is not restricted to the details of any foregoing embodiments. The present disclosure extends to any novel one, or any novel combination, of the features disclosed in this specification (including any accompanying claims, abstract and drawings), or to any novel one, or any novel combination, of the steps of any method or process so disclosed.

The invention claimed is:

1. A cable tie arrangement for bundling one or more members, the cable tie arrangement comprising:
   a continuous strap having a first planar surface free of any racks; and
   a separate locking head defining an opening and having a metal locking element comprising a pair of opposed teeth including a first tooth supported by a first supporting portion extending partially along a length of the first tooth and a second tooth supported by a second supporting portion extending partially along a length of the second tooth,
   wherein, in use, the strap comprises a looped section arranged to bundle the one or more members on a first side of the locking head, wherein the looped section has an end section and a supply section extending through the locking head to a second side of the locking head in a first direction,
   wherein the opposed teeth are arranged to engage the first planar surface of the end section and the supply section to prevent movement of the end section and the supply section in a second direction opposed to the first direction and to allow movement of the supply section in the first direction, and
   wherein the opposed teeth extend towards one another in the opening, to press the end section and the supply section together in the opening.

2. The cable tie arrangement of claim 1, wherein the first planar surface has a first raised central portion.

3. The cable tie arrangement of claim 2, wherein the strap comprises a second raised central portion on an opposed side of the strap to the first raised central portion.

4. The cable tie arrangement of claim 3, wherein the opposed teeth are arranged to engage the first raised central portion.

5. The cable tie arrangement of claim 2, wherein the opposed teeth are arranged to engage the first raised central portion.

6. The cable tie arrangement of claim 1, wherein the strap comprises a second planar surface opposed the first planar surface.

7. The cable tie arrangement of claim 6, wherein the second planar surface is arranged substantially a same as the first planar surface.

8. The cable tie arrangement of claim 1, wherein the locking head comprises one or more shoulders configured to guide the strap through the opening.

9. The cable tie arrangement of claim 1, wherein the metal locking element circumscribes the opening.

10. The cable tie arrangement of claim 1, wherein the locking head comprises inter-engaging elements configured to engage with a further corresponding locking head.

11. The cable tie arrangement of claim 1, wherein the strap has a thickness, and the opposed teeth define a gap extending perpendicularly therebetween, and wherein the gap is substantially twice the thickness of the strap.

12. The cable tie arrangement of claim 1, wherein the strap is mounted on a magazine.

13. A cable tie arrangement for bundling one or more members, the cable tie arrangement comprising:
   a continuous strap having a planar surface, the strap formable into a looped section arranged to bundle the one or more members and such that the looped section has an end section and a supply section; and
   a separate locking head defining an opening and having a pair of opposed teeth extending toward each other in the opening, the teeth arranged to engage the strap when the strap extends through the opening in the locking head, the teeth arranged to press the end section and the supply section together in the opening, the teeth arranged to engage the planar surface of the end section and the supply section to allow movement of the supply section in a first direction and to prevent movement of the end section and the supply section in a second direction opposite the first direction,
   wherein each of the opposed teeth is supported by a separate supporting portion extending partially along a length of that tooth.

14. The cable tie arrangement of claim 13, wherein the planar surface has a first raised central portion.

15. The cable tie arrangement of claim 14, wherein the strap comprises a second raised central portion on an opposed side of the strap to the first raised central portion.

16. The cable tie arrangement of claim 15, wherein the opposed teeth are arranged to engage the first raised central portion.

17. The cable tie arrangement of claim 14, wherein the opposed teeth are arranged to engage the first raised central portion.

18. The cable tie arrangement of claim 13, wherein the locking head comprises one or more shoulders configured to guide the strap through the opening.

19. The cable tie arrangement of claim 13, wherein the strap has a thickness, and the opposed teeth define a gap extending perpendicularly therebetween, and wherein the gap is substantially twice the thickness of the strap.

* * * * *